US012254615B1

(12) United States Patent
Huang

(10) Patent No.: US 12,254,615 B1
(45) Date of Patent: Mar. 18, 2025

(54) METHOD AND DEVICE FOR AUTOMATICALLY PRE-DETECTING PAPER CUP DESIGN DEFECTS

(71) Applicant: Shenzhen Saiwai Technology Co., Ltd., Guangdong (CN)

(72) Inventor: Ming Huang, Guangdong (CN)

(73) Assignee: Shenzhen Saiwai Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/896,978

(22) Filed: Sep. 26, 2024

(51) Int. Cl.
*G06T 7/00* (2017.01)
*G06T 3/40* (2006.01)
*G06T 3/60* (2006.01)
*G06T 7/10* (2017.01)

(52) U.S. Cl.
CPC ............. *G06T 7/0008* (2013.01); *G06T 3/40* (2013.01); *G06T 3/60* (2013.01); *G06T 7/10* (2017.01); *G06T 2207/20084* (2013.01); *G06T 2207/30144* (2013.01)

(58) Field of Classification Search
CPC ........... B65D 3/06; G06T 7/0002–001; G06T 2207/30144; G06T 2207/30124; G06T 7/10; G06T 7/11; G06T 7/12; G06T 7/194; G06T 3/40; G06T 3/60; G06T 2207/20081; G06T 2207/20084; G06V 10/26;
(Continued)

(56) References Cited

U.S. PATENT DOCUMENTS

2006/0226865 A1 10/2006 Gallarda et al.
2023/0385466 A1* 11/2023 Harvill .................... G06F 30/12

FOREIGN PATENT DOCUMENTS

| CN | 102928438 A | 2/2013 |
| CN | 115239719 A | 10/2022 |
| CN | 115249237 A | 10/2022 |

(Continued)

OTHER PUBLICATIONS

Wang, Ping, et al. "Research and Evaluation on an Optical Automatic Detection System for the Defects of the Manufactured Paper Cups." Sensors 23.3 (2023): 1452. (Year: 2023).*

(Continued)

*Primary Examiner* — Geoffrey E Summers

(57) ABSTRACT

Disclosed are method and device for automatically pre-detecting paper cup design defects. The method includes: receiving an imported design drawing to be detected, and obtaining a corresponding fan-shaped image mask through the trained image segmentation model; converting the fan-shaped image mask into a real fan-shaped frame; calculating and obtaining a corresponding target model design drawing according to the real fan-shaped frame, and mapping to the specification data of a corresponding model; and partitioning the real fan-shaped frame according to the mapped specification data, detecting corresponding defects in each partition through a preset detection module, and outputting defect detection results. The present disclosure enables identification of design defects solely through graphic design drafts, thereby reducing costs, enhancing flexible production capabilities, and filling a gap in the paper cup industry. Defect detection functions are pluggable, that is, ineffective detection modules can be replaced, and new detection items can be added.

8 Claims, 5 Drawing Sheets

(58) Field of Classification Search
CPC .. G06V 10/267; G06V 10/273; G06V 10/454; G06V 10/82; G06N 3/02–0985
See application file for complete search history.

(56) References Cited

FOREIGN PATENT DOCUMENTS

| | | | | |
|---|---|---|---|---|
| CN | 115994882 A | 4/2023 | | |
| CN | 116309526 A | * 6/2023 | ............... | G06N 3/04 |
| CN | 117036243 A | 11/2023 | | |
| CN | 117348357 A | 1/2024 | | |
| CN | 117541698 A | 2/2024 | | |
| KR | 102617654 B1 | * 12/2023 | | |

OTHER PUBLICATIONS

1st Office Action of counterpart Chinese Patent Application No. 202410062554.8 issued on May 31, 2024.
Notice of Allowance of counterpart Chinese Patent Application No. 202410062554.8 issued on Jun. 17, 2024.
Gao, Ya, Study on rapid detection technology of elegant and paper cup defects, China Excellent Master's Dissertation Full-text Database Information Technology Series, No. 1, 2019, Jan. 15, 2019, pp. 1138-3626.

* cited by examiner

METHOD AND DEVICE FOR AUTOMATICALLY PRE-DETECTING PAPER CUP DESIGN DEFECTS

CROSS REFERENCE TO RELATED APPLICATIONS

The present application claims the benefit of Chinese Patent Application No. 202410062554.8 filed on Jan. 16, 2024, the contents of which are incorporated herein by reference in their entirety.

TECHNICAL FIELD

The present disclosure relates to the technical field of paper cup detection, and in particular to a method and device for automatically pre-detecting paper cup design defects.

BACKGROUND

Production of a paper cup requires numerous steps, including graphic design, typesetting, finalization, plate making (plate imposition or special plate making), publishing, printing, die cutting, molding, and the like. Designs of paper cups are characterized by rich design content and complex expression, such that the following design or printing defects often occur in actual production:
  (1) paper cups of another model are designed by using a template for any other model of paper cups, resulting in that a design drawing for small paper cups is used for production of large paper cups, or a design drawing for large paper cups is used for production of small paper cups, such that all printed products are completely scrapped;
  (2) a rectangular area does not fit a fan-shaped arc (no arc discharge), resulting in that a design content in the rectangular area of a paper cup is skewed after molding;
  (3) content of intermediate steps of design such as auxiliary lines, borders and prompts for customers is not deleted, resulting in that finished products are completely scrapped because such content is printed on product surfaces;
  (4) non-compliance with the new national standard GB/T 27590-2022 "Paper Cup" which was implemented on Feb. 1, 2023 and specifies: patterns shall not be printed within 15 mm (excluding 15 mm) from the mouth of the cup to the body of the cup. The capacity marking with a total length of no more than 10 mm can be printed within 15 mm (excluding 15 mm) from the mouth of the cup to the body of the cup;
  (5) no bleed results in white leakage or content cutting after die-cutting and molding;
  (6) layers are lost after the design drawing is exported;
  (7) typos occur when design content is manually input; and
  (8) errors occur in important numbers, website addresses, and the like.

To sum up, all the above defects, in combination with other possible defects, can be found only after paper cups are completely finished at present, thereby causing a lot of quality control and quality problems and huge losses.

Particularly in recent years, China has vigorously advocated production models of flexible production, customization, and small-order quick response. In this context, the above problems have become more and more prominent, hindering the promotion and improvement of flexible and customized production models for the paper cup industry. Because the order quantity is not large and there exist so many possible hidden defects, repeated proofing and repeated review of an entire production are required to avoid such defects, which makes the small-order quick response model nearly infeasible.

Therefore, there is an urgent need for the paper cup industry to develop a system or solution that is capable of effectively detecting these problems before printing. In view of constantly emerging errors in actual designs, such a system should allow for addition of new detection functions, as well as updates or deactivations of existing functions at any time. However, the paper cup industry primarily relies on manual inspection of such defects, lacking relevant technical solutions.

In view of this, it is necessary to provide a method and device for automatically pre-detecting paper cup design defects to overcome the above defects.

SUMMARY

An objective of the present disclosure is to provide a method and device for automatically pre-detecting paper cup design defects to solve the existing problem of the paper cup industry that defects cannot be effectively detected before printing of paper cups. The present disclosure enables identification of design defects solely through graphic design drafts, thereby reducing costs, enhancing flexible production capabilities, and filling a gap in the paper cup industry.

To achieve the above objective, the present disclosure, in a first aspect, provides a method for automatically pre-detecting paper cup design defects. The method includes the following steps:
  S10: obtaining a design drawing set with a preset precise mask covering an entire fan-shaped frame and also prompts or annotations, where the design drawing set includes a defect-free design drawing, a defective design drawing, and a design drawing constructed according to specification data;
  S20: obtaining an image segmentation model for detecting an image segmentation mask constructed based on a neural network technology, and importing the design drawing set into the image segmentation model for training;
  S30: receiving an imported design drawing to be detected, and obtaining a corresponding fan-shaped image mask through the trained image segmentation model;
  S40: converting the fan-shaped image mask into a real fan-shaped frame;
  S50: calculating and obtaining a corresponding target model design drawing according to the real fan-shaped frame, and mapping to the specification data of a corresponding model; and
  S60: partitioning the real fan-shaped frame according to the mapped specification data, detecting corresponding defects in each partition through a preset detection module, and outputting defect detection results.

In a preferred embodiment, the S10 includes the following sub-steps:
  obtaining an imported design drawing set that has been used in production and is error-free, generating a precise mask covering the entire fan-shaped frame through a preset automatic annotation module, and generating a prompt or annotation; or
  obtaining an imported design drawing set containing design errors, assisting to manually generate a precise mask covering the entire fan-shaped frame through a preset auxiliary annotation module, and generating a prompt or annotation.

In a preferred embodiment, the S10 includes the following sub-steps:

S11: obtaining a preset fan-shaped image design template;

S12: assisting to manually acquire fan-shaped image specification data through a preset software UI interaction module, where the fan-shaped image specification data includes a left side line, a right side line, an angle between the two side lines, lengths of the two side lines, an upper arc vertex, a lower arc vertex, and a center and a radius of a concentric circle in a printing area;

S13: automatically constructing a fan-shaped image design drawing according to the image design template and the fan-shaped image specification data, where content in the printing area of the fan-shaped image design drawing can be left blank or randomly generated;

S14: adding interference information to the fan-shaped image design drawing; and S15: based on the fan-shaped image specification data, generating a precise mask covering the entire fan-shaped frame through a preset automatic annotation module, and generating a prompt or annotation.

In a preferred embodiment, the S10 further includes the following sub-step:

performing one or a combination of more of the following operations on design drawings in the design drawing set: image rotation, scaling, cropping, color changing, and noise addition.

In a preferred embodiment, the S20 includes the following sub-steps:

importing the design drawing set into the image segmentation model for a preset round of training to obtain an image segmentation model that has completed an initial round of training;

inputting a preset test set into the image segmentation model that has completed the initial round of training to verify an effect of generating a fan-shaped image mask of paper cup;

when verification results do not meet expected conditions, adjusting, adding, partially deleting, or completely deleting selected annotation data, and then continuing to input new annotation data into the image segmentation model for training; and repeating the above steps for a preset cycle until obtaining an image segmentation model with desired testing effects achieved.

In a preferred embodiment, the S30 includes the following sub-steps:

inputting a design drawing to be detected into the trained image segmentation model and determining whether a fan-shaped image mask is successfully obtained;

in case of failure to obtain the mask, detecting a fan-shaped image through a built-in target detection module of the image segmentation model, to obtain a detection frame of the fan-shaped image;

transmitting the detection frame to a built-in segmentation module of the image segmentation model, and attempting to obtain a fan-shaped image mask again; and when the image segmentation model still fails to obtain the fan-shaped image mask after attempting for a preset number of times, determining failure of obtaining, and outputting information of detection failure.

In a preferred embodiment, the S30 includes the following sub-steps:

converting a mask into a binary image to obtain a mask image in the format of an image file;

obtaining a minimum frame of the mask image; and cropping and normalizing the mask image to a size corresponding to an actual size of image.

In a preferred embodiment, the S40 includes the following sub-steps:

S41: setting a window of a preset size;

S42: traversing target pixels of a mask frame;

S43: for an area where the target pixels have a fixed size and a corresponding area of the design drawing to be detected, saving pixels on the design drawing; and S44: cyclically executing the steps S42-S43 until all pixels of the mask frame are traversed, to obtain a contour of the entire fan-shaped frame.

In a preferred embodiment, the S60 includes the following sub-steps:

detecting whether a model matches according to an angle between straight lines on both sides of the fan-shaped frame, lengths of the two sides, and positions of an upper arc vertex and a lower arc vertex; and/or, traversing pixels beyond a fan-shaped area of an image and checking existence of any non-zero pixels to determine whether there is any content beyond the fan-shaped area; and/or, traversing pixels within the fan-shaped area and beyond a printing area, and checking existence of any non-zero pixels to determine whether there is any content beyond the printing area; and/or, checking whether a white space left in an upper part of paper cup beyond the printing area complies with relevant national standards.

The present disclosure, in a second aspect, provides a device for automatically pre-detecting paper cup design defects. The device includes:

a design drawing set acquisition module, configured for obtaining a design drawing set with a preset precise mask covering an entire fan-shaped frame and also a prompt or annotation, where the design drawing set includes a defect-free design drawing, a defective design drawing, and a design drawing constructed according to specification data;

a model acquisition module, configured for obtaining an image segmentation model for detecting an image segmentation mask constructed based on a neural network technology, and importing the design drawing set into the image segmentation model for training;

a mask segmentation module, configured for receiving an imported design drawing to be detected, and obtaining a corresponding fan-shaped image mask through the trained image segmentation model;

a mask conversion module, configured for converting the fan-shaped image mask into a real fan-shaped frame;

a model mapping module, configured for calculating and obtaining a corresponding target model design drawing according to the real fan-shaped frame, and mapping to the specification data of a corresponding model; and a partition detection module, configured for partitioning the real fan-shaped frame according to the mapped specification data, detecting corresponding defects in each partition through a preset detection module, and outputting defect detection results.

In a third aspect, the present disclosure provides a terminal. The terminal includes a memory, a processor, and a computer program stored in the memory, where when the computer program is executed by the processor, various steps of the method for automatically pre-detecting paper cup design defects according to any of the above embodiments are implemented.

In a fourth aspect, the present disclosure provides a computer-readable storage medium. A computer program is stored in the computer-readable storage medium, and when the computer program is executed by the processor, various steps of the method for automatically pre-detecting paper cup design defects according to any of the above embodiments are implemented.

In a fifth aspect, the present disclosure provides a computer program product, and the product includes a computer program or instructions, where when the computer program or the instructions are executed by the processor, various steps of the method for automatically pre-detecting paper cup design defects according to any of the above embodiments are implemented.

According to the method and device for automatically pre-detecting paper cup design defects provided by the present disclosure, an image segmentation model capable of precisely obtaining an image segmentation mask is constructed and trained, the obtained segmentation mask is analyzed and mapped to an image of a corresponding model, to obtain specification data of the corresponding model. Then an input design drawing to be detected is partitioned according to the specification data of the image. Finally, different defect detection modules can be called to perform corresponding defect detection in different areas. The present disclosure enables identification of design defects solely through graphic design drafts, thereby reducing costs, enhancing flexible production capabilities, and filling a gap in the paper cup industry. The present disclosure constitutes a foundation and premise for automatic and unmanned plate imposition. Defect detection functions are pluggable, that is, ineffective detection modules can be replaced, and new detection items can be added, without need to change basic modules.

BRIEF DESCRIPTION OF THE DRAWINGS

To describe the technical solution in the examples of the present disclosure more clearly, the accompanying drawings required for describing the examples are briefly described below. It should be understood that the following accompanying drawings show merely some examples of the present disclosure, and therefore it should not be construed as a limitation to the scope. Those of ordinary skill in the art can also derive other accompanying drawings from these accompanying drawings without making inventive efforts.

DETAILED DESCRIPTIONS OF THE EMBODIMENTS

Figure 1:
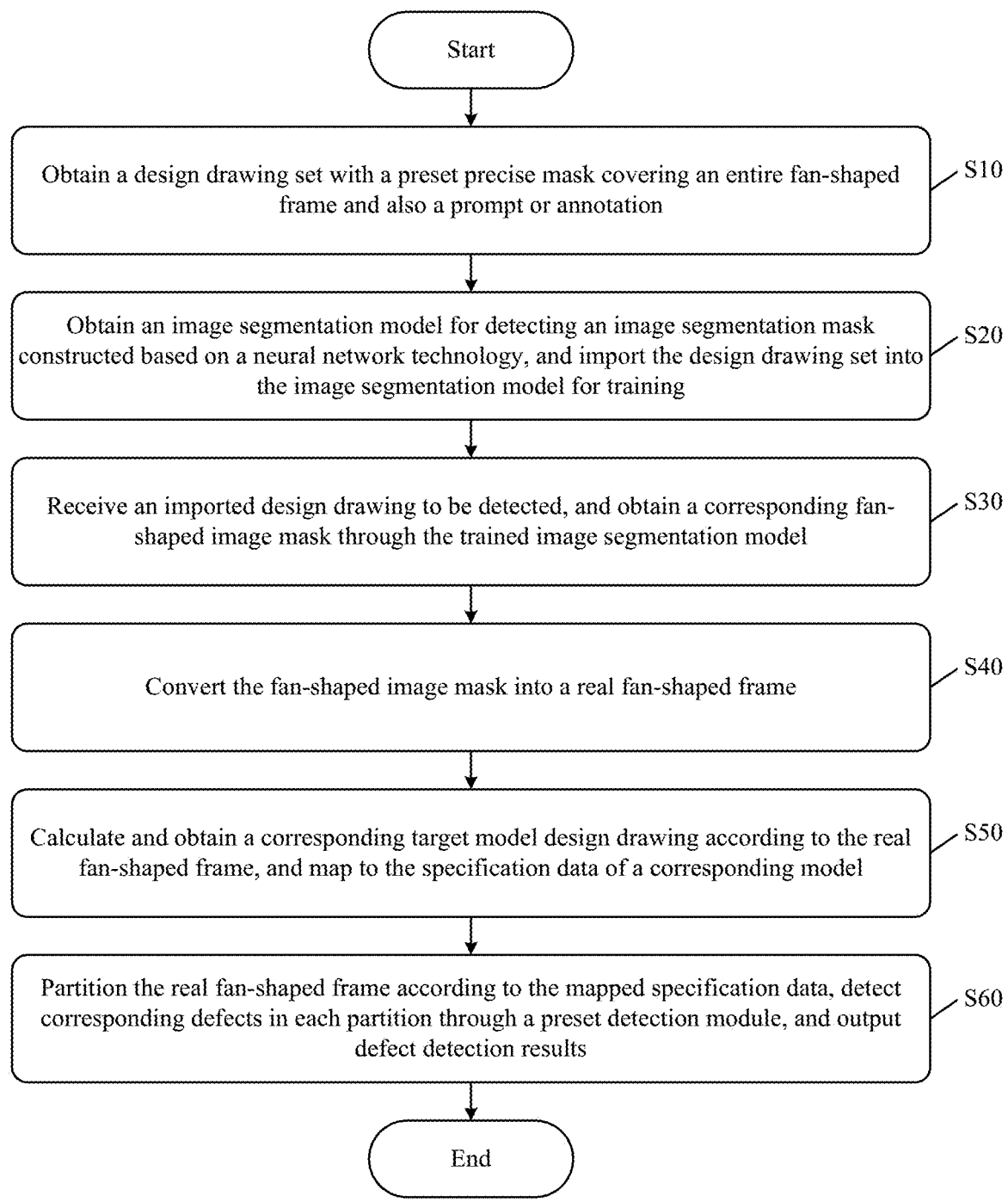
FIG. 1 is a flowchart of a method for automatically pre-detecting paper cup design defects provided by the present disclosure.

To make objectives, technical solutions and beneficial technical effects of the present disclosure clearer, the present disclosure will be further described in detail with reference to accompanying drawings and specific embodiments. It should be understood that the specific embodiments described in the present specification are merely illustrative of the present disclosure and are not intended to limit the present disclosure.

It should also be understood that the terms used in the present specification are merely for the purpose of describing specific examples and are not intended to limit the present disclosure. As used in the present specification and the appended claims, the singular terms "a", "an" and "the" are intended to include the plural forms unless clearly indicated otherwise in the context.

It should be further understood that the term "and/or" as used in the present specification and the appended claims refers to and includes any or all possible combinations of one or more of the associated listed items.

It should be noted that before describing the technical solution of the present disclosure in detail, some specialized terms that may be involved need to be explained first, such that readers can easily understand the content of the present disclosure.

(1) Mask/segmentation mask: is a technique in computer vision that is used to precisely separate an object in an image from a background. All pixels are classified and labeled to achieve fine-grained segmentation of image areas. Each pixel is assigned with a label indicating its nature of belonging to a foreground or a background, or a different object category. Such label information forms a two-dimensional matrix, i.e., a segmentation mask.

(2) Prompt: is a prompt for image segmentation, which can be a set of foreground/background points, a rough box or mask, free-form text, or, in general, any information indicating what to segment in an image.

(3) Promptable segmentation task: means returning a valid segmentation mask given any segmentation prompt. A "valid" mask simply means that even when a prompt is ambiguous and could refer to multiple objects, the output should be a reasonable mask for at least one of those objects.

(4) Boundingbox (Bbox): Bbox is a rectangular box used to enclose surrounding target objects, and is also known as a detection box. The rectangular box defines a size, a position and an orientation of a target. Bbox is usually represented by four corners that are commonly referred to as a top-left corner, a top-right corner, a bottom-right corner, and a bottom-left corner. In a computer vision algorithm, Bbox is usually associated with target detection tasks. Target detection is a computer vision task that aims to automatically detect an existence and a location of a target object in an image or a video.

(5) Annotation/data annotation: Data annotation the data annotation is a key link for effective operation of most artificial intelligence algorithms. In simple terms, the data annotation is a process of processing unprocessed voices, images, text, videos and other data and turning them into machine-recognizable information. Types of the data annotation mainly include image annotation, voice annotation, 3D point cloud annotation, and text annotation. The image annotation is a process of processing and converting unprocessed image data into machine-readable information, and then sending to an artificial intelligence algorithm and model for retrieval. Common image annotation methods include semantic segmentation, rectangular box annotation, polygon annotation, keypoint annotation, point cloud annotation, 3D cube annotation, 2D/3D fusion annotation, target tracking, and the like.

(6) Image segmentation model: is a neural network model that implements semantic segmentation or instance segmentation.

(7) Object locating model: is a neural network model that implements object localization.

(8) Data enhancement: in order to improve the generalization capability of a neural network and avoid overfitting, image operations such as rotation, scaling, cropping, color changing, and noise addition are required to increase input data and enrich a training set in data size.

(9) Fine tuning/fine adjustment: refers to large-scale pre-training on general domain data and adaptation to specific tasks or domains.

(10) Paper cup image/image frame/image area/image/fan-shaped frame: is an image formed by die-cutting after printing of a paper cup, which is an area enclosed by a fan-shaped frame at the design stage.

(11) Fan-shaped image specification data: includes a left side line, a right side line, an angle between the two side lines, lengths of the two side lines, an upper arc vertex, a lower arc vertex, and a center and a radius of a concentric circle in a printing area related to a fan-shaped frame of a paper cup of specific model.

(12) National standard for paper cups: refers to the national standard GB/T 27590-2022 "Paper Cup".

(13) Bleed: refers to a portion reserved for easy cutting to retain an effective content of an image during printing, and is a common term in printing. The bleed in printing refers to a margin that enlarges external dimensions of a product by using a pattern and adds some extension of pattern at a cutting position, which is specially used within tolerance ranges of various production processes to avoid white leakage or content cutting of a finished product after cutting. During production, we differentiate a design size from a finished size, and the design size is always larger than the finished size. The larger edge must be cut off after printing. An extra portion beyond the finished size needs to be printed and cut off. The portion that needs to be cut off after printing is called bleed or a bleed area.

(14) Pluggable: is a system architecture that allows for addition or removal of components at any time without affecting other modules or functions.

Example 1

In an example of the present disclosure, a method for automatically pre-detecting paper cup design defects is provided. The present disclosure enables identification of design defects solely through graphic design drafts, such that defects in a design drawing can be detected before a paper cup is printed. Without need of proofing, the present disclosure is well-suited to production models of flexible production, customization, and small-order quick response, significantly contributes to quality control in paper cup production, enhances flexible production capabilities, and fills a gap in the paper cup industry, ultimately realizing automatic and unmanned plate imposition for paper cups.

As illustrated in FIG. 1, the method for automatically pre-detecting paper cup design defects includes steps S10-S60.

S10: a design drawing set with a preset precise mask covering an entire fan-shaped frame and also a prompt or annotation is obtained, where the design drawing set includes a defect-free design drawing, a defective design drawing, and a design drawing constructed according to specification data;

Specifically, for an existing design drawing set formed by a plurality of design drawings, the S10 includes the following steps:

an imported design drawing set that has been used in production and is error-free is obtained, a precise mask covering the entire fan-shaped frame is generated through a preset automatic annotation module, and a prompt or annotation is generated; or an imported design drawing set containing design errors is obtained, a precise mask covering the entire fan-shaped frame is manually generated through a preset auxiliary annotation module, and a prompt or annotation is generated.

Figure 2:
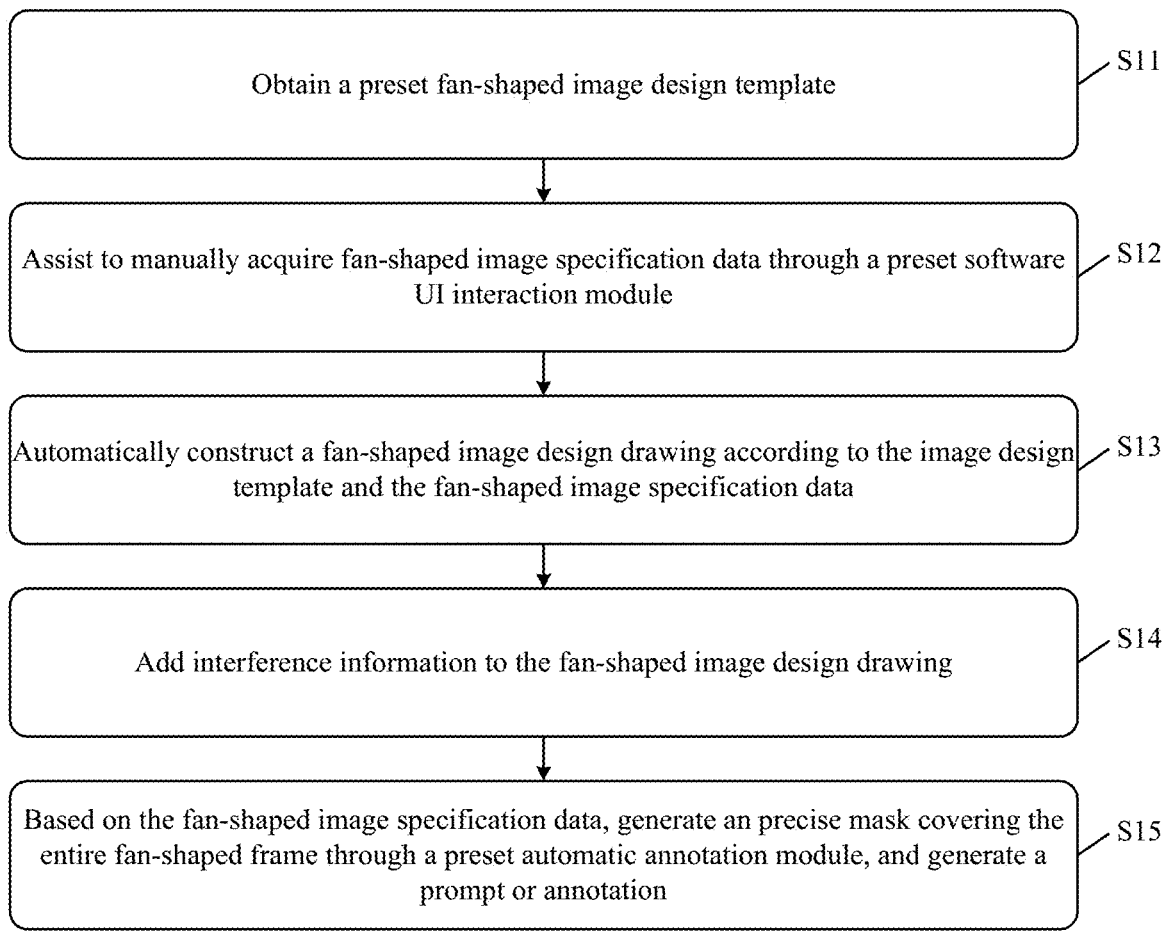
FIG. 2 is a sub-flowchart of S10 of the method for automatically pre-detecting paper cup design defects shown in FIG. 1.

For a design drawing constructed according to specification data, as illustrated in FIG. 2, the S10 includes the following sub-steps:

S11: a preset fan-shaped image design template is obtained;

S12: fan-shaped image specification data is manually acquired through a preset software UI interaction module, where the fan-shaped image specification data includes a left side line, a right side line, an angle between the two side lines, lengths of the two side lines, an upper arc vertex, a lower arc vertex, and a center and a radius of a concentric circle in a printing area;

S13: a fan-shaped image design drawing is automatically constructed according to the image design template and the fan-shaped image specification data, where content in the printing area of the fan-shaped image design drawing can be left blank or randomly generated; It should be noted that automatically constructing a corresponding design drawing according to a design template and corresponding specification data is a conventional technical means in the design field, and a same principle is also applied in the subfield of fan-shaped image design, which will not be repeated herein.

S14: interference information is added to the fan-shaped image design drawing; and that is, various defects are artificially created in a fan-shaped image design drawing, such as adding auxiliary lines and random prompts, to simulate situations that may be encountered during actual production as much as possible, thereby enhancing versatility of a neural network model.

S15: based on the fan-shaped image specification data, a precise mask covering the entire fan-shaped frame is generated through a preset automatic annotation module, and a prompt or annotation is generated.

Alternately, steps S13-S15 may be executed cyclically for a preset number of times to generate a final design drawing set, mask, prompt or annotation.

It should be noted that in the S10, an annotation function of the auxiliary annotation module or the automatic annotation module has already been relatively mature in application to the neural network model, and reference to the prior art can be made for its implementation principles and specific embodiments, which will not be repeated herein.

Further, the S10 further includes: one or a combination of more of the following operations are performed on design drawings in the design drawing set: image rotation, scaling, cropping, color changing, and noise addition. That is, data enhancement is performed on an initial design drawing set, and the above operations are randomly combined to improve a generalization capability of subsequent model training.

S20: an image segmentation model for detecting an image segmentation mask constructed based on a neural network technology is obtained, and the design drawing set is imported into the image segmentation model for training.

Figure 3:
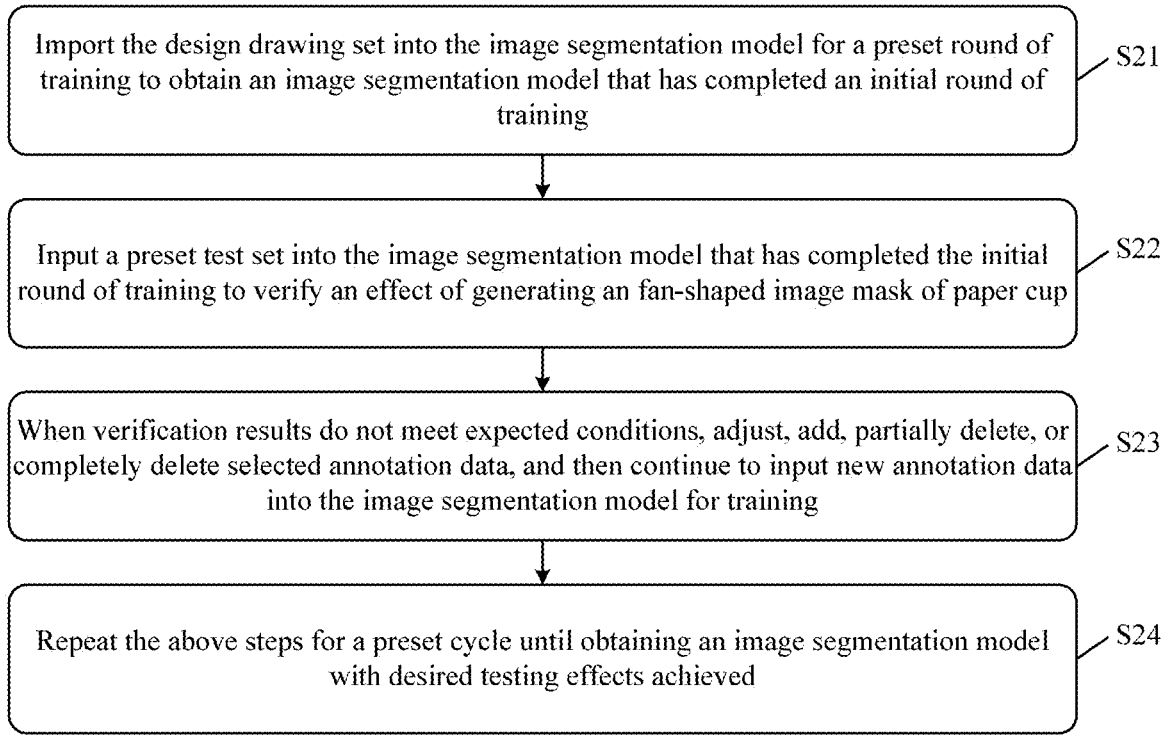
FIG. 3 is a sub-flowchart of S20 of the method for automatically pre-detecting paper cup design defects shown in FIG. 1.

Specifically, as illustrated in FIG. 3, the S20 includes sub-steps S21-S24:

S21: the design drawing set is imported into the image segmentation model for a preset round of training to obtain an image segmentation model that has completed an initial round of training;

S22: a preset test set is input into the image segmentation model that has completed the initial round of training to verify an effect of generating a fan-shaped image mask of paper cup;

S23: when verification results do not meet expected conditions, selected annotation data is adjusted, added, partially deleted, or completely deleted, and then new annotation data is further input into the image segmentation model for training; and S24: the above steps are repeated for a preset cycle until obtaining an image segmentation model with desired testing effects achieved.

In Example 1, S30 includes: an imported design drawing to be detected is received, and a corresponding fan-shaped image mask is obtained through the trained image segmentation model.

Figure 4:
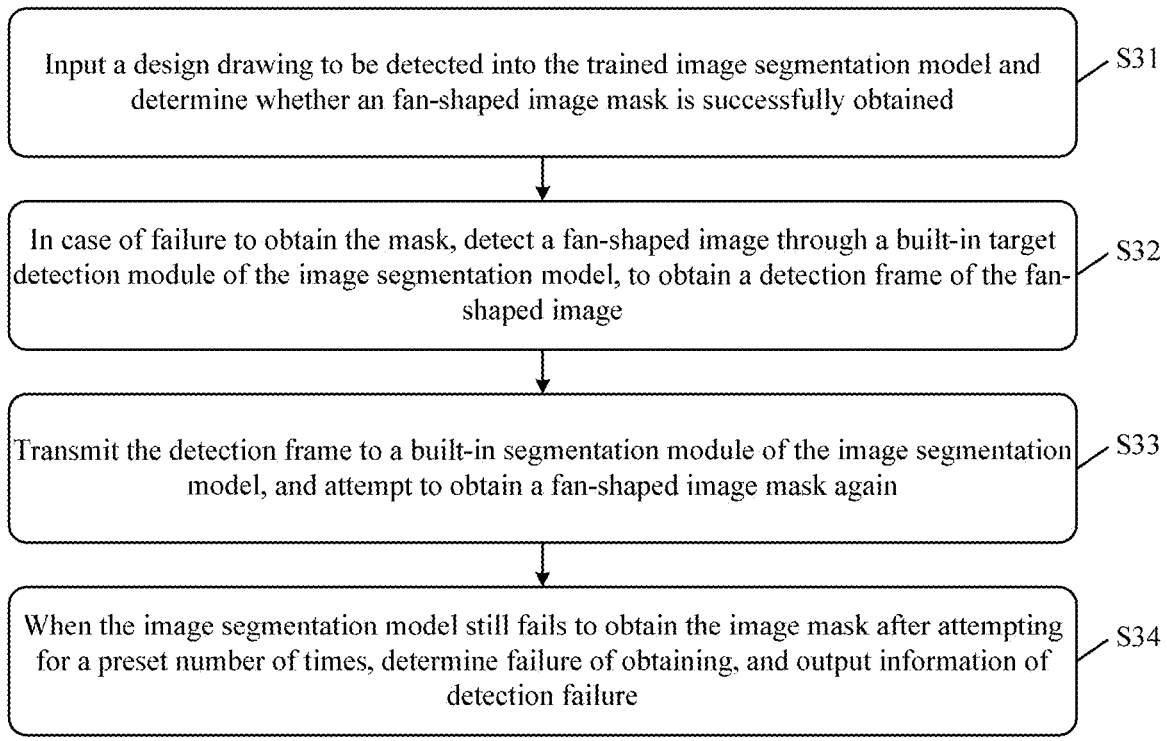
FIG. 4 is a sub-flowchart of S30 of the method for automatically pre-detecting paper cup design defects shown in FIG. 1.

Specifically, as illustrated in FIG. 4, the S30 includes sub-steps S31-S34:

S31: a design drawing to be detected is input into the trained image segmentation model, and whether a fan-shaped image mask is successfully obtained is determined;

S32: in case of failure to obtain the mask, a fan-shaped image is detected through a built-in target detection module of the image segmentation model, to obtain a detection frame (i.e., Bbox) of the fan-shaped image;

S33: the detection frame is transmitted to a built-in segmentation module of the image segmentation model, and an attempt is made to obtain a fan-shaped image mask again; and S34: when the image segmentation model still fails to obtain the fan-shaped image mask after attempting for a preset number of times, failure of obtaining is determined, and information of detection failure is output.

Further, the S30 further includes: a mask is converted into a binary image to obtain a mask image in the format of an image file; a minimum frame (boundingbox) of the mask image is obtained; and the mask image is cropped and normalized to a size corresponding to an actual size of image.

S40: the fan-shaped image mask is converted into a real fan-shaped frame.

Figure 5:
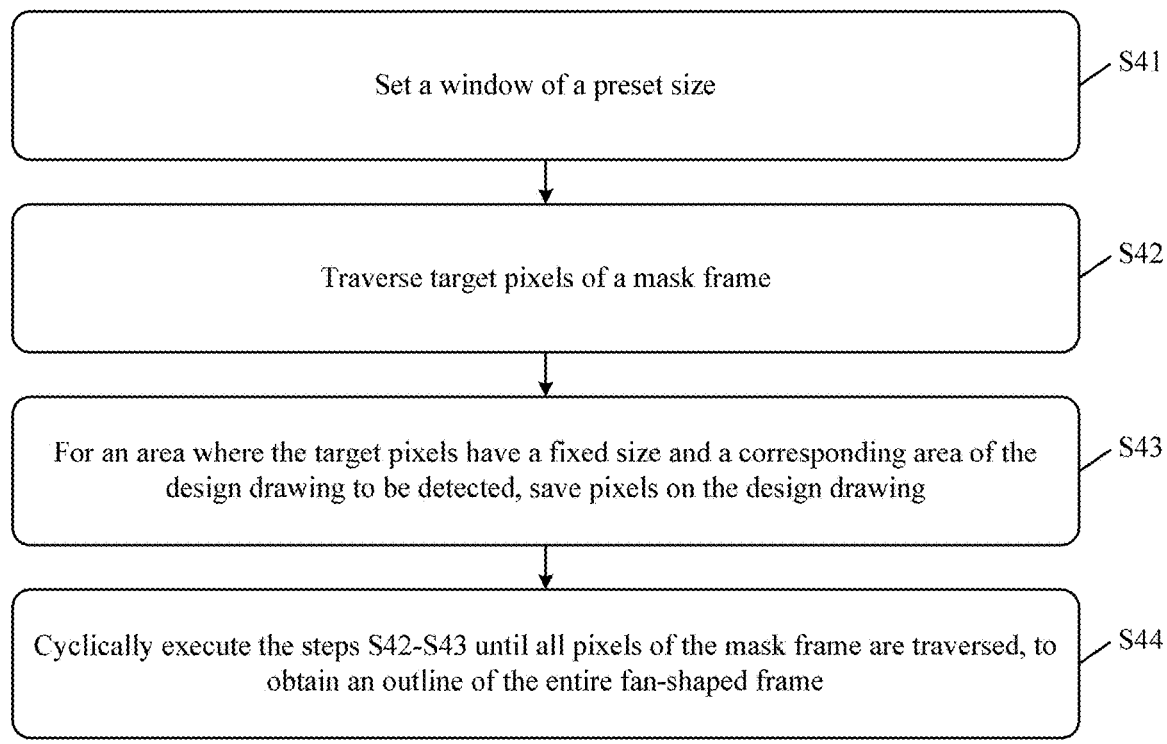
FIG. 5 is a sub-flowchart of S40 of the method for automatically pre-detecting paper cup design defects shown in FIG. 1.

Specifically, as illustrated in FIG. 5, the S40 includes sub-steps S41-S44:

S41: a window of a preset size is set;
S42: target pixels of a mask frame are traversed;

S43: for an area where the target pixels have a fixed size and a corresponding area of the design drawing to be detected, pixels are saved on the design drawing; and S44: the steps S42-S43 are cyclically executed until all pixels of the mask frame are traversed, to obtain a contour of the entire fan-shaped frame. That is, according to pixels at an edge of a fan-shaped image mask area, an edge contour of a corresponding area in an original design drawing is obtained.

S50: a corresponding target model design drawing is calculated and obtained according to the real fan-shaped frame, and mapped to the specification data of a corresponding model. When mapping of the specification data fails, an error prompt message is returned.

It can be understood that the specification data of all possible paper cup models can be pre-stored in a storage medium for subsequent comparative mapping. A linear equation for both sides of the contour of the entire fan-shaped frame, lengths of both sides thereof, vertices of upper and lower arcs, and other data can be calculated. Based on the above data, a corresponding design drawing of a specific model can be obtained and mapped to the specification data of the corresponding model.

It should be noted that determination of the fan-shaped frame is a basis of error detection. When the fan-shaped frame cannot be determined, the error detection cannot be initiated. When a conventional image algorithm is employed to obtain the fan-shaped frame, results are easily affected by factors such as image quality and content changes, which results in extremely poor parameter adaptation, unstable output, and very complicated post-processing, such that it is difficult to apply in actual production. However, under conditions of high data quality, a neural network demonstrates excellent and stable effects of target detection, image segmentation and edge detection, and also good generalization capability. Therefore, a method of training the neural network to obtain the fan-shaped frame can be fully applied in actual production. Therefore, after a precise fan-shaped frame is obtained, different defect detection processes can be executed by partition.

S60: the real fan-shaped frame is partitioned according to the mapped specification data, corresponding defects in each partition are detected through a preset detection module, and defect detection results are output. For example, according to preset national standards, the fan-shaped frame can be divided into straight edges, upper and lower arcs, inside of a fan-shaped area, outside of the fan-shaped area, a white space, bleed, and the like.

Specifically, the S60 includes one or more of the following detection steps, and each detection is performed through its corresponding defect detection module without interfering with each other, that is, each detection module is pluggable, and different defect detection modules can be called to perform corresponding defect detection in different areas according to specific needs. Further, ineffective detection modules can be replaced, and new detection items can be added, without need to change basic modules. The above defect detection modules can be various detection heads built into the image segmentation model, or separate detection models constructed and trained based on neural network technology. These defect detection modules can be obtained through specific training with corresponding training sets, and are pluggable at any time. For a specific construction and training process, reference to the prior art can be made, which will not be repeated herein.

The detection method specifically includes: whether a model matches is detected according to an angle between straight lines on both sides of the fan-shaped frame, lengths of the two sides, and positions of an upper arc vertex and a lower arc vertex; and/or, pixels beyond a fan-shaped area of an image are traversed, and existence of any non-zero pixels is checked to determine whether there is any content (generally including auxiliary lines and prompts) beyond the fan-shaped area; and/or, pixels within the fan-shaped area and beyond a printing area are traversed, and existence of any non-zero pixels to determine whether there is any content beyond the printing area is checked; and/or, whether a white space left in an upper part of paper cup of paper cup beyond the printing area complies with relevant national standards is checked.

Figure 6:
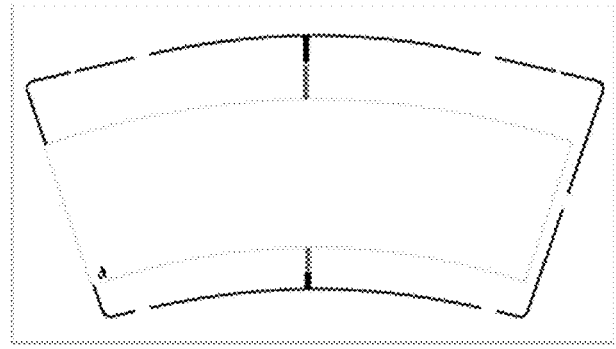
FIG. 6 is a design diagram to be detected according to an exemplary specific example.
Figure 7:
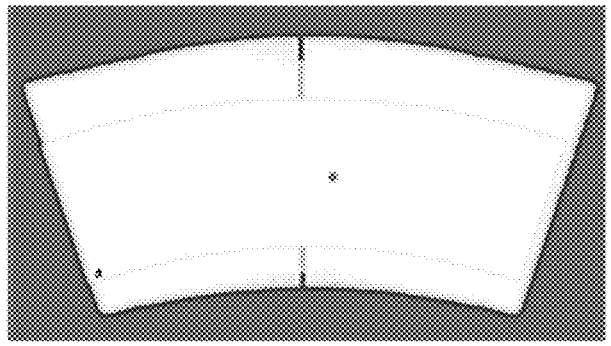
FIG. 7 is a complete fan-shaped frame of the design drawing to be detected shown in FIG. 6 that is identified and segmented by an image segmentation model.
Figure 8:
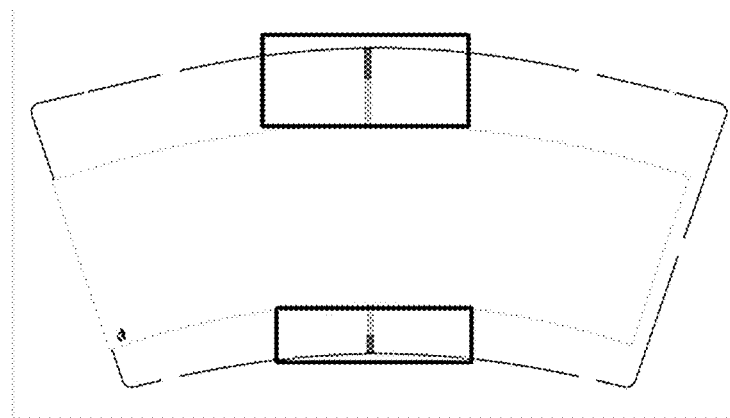
FIG. 8 illustrates a defect of "auxiliary design information is not deleted yet" that is identified in the fan-shaped frame segmented in FIG. 7 and marked with "Bbox".

In an exemplary specific example, FIG. 6 illustrates a design drawing to be detected that contains a defect of "prompts in a design drawing are not deleted"; FIG. 7 illustrates a complete fan-shaped frame of the design drawing to be detected that is identified and segmented by an image segmentation model; and FIG. 8 illustrates a defect identified by the defect detection module and marked by the detection box (Bbox). It should be noted that text in FIGS. 6-8 is merely an example of the defect of "prompts in a design drawing are not deleted", which is only for reference. The specific content and clarity of the text neither serve as a specific limitation on the present disclosure, nor affect full disclosure of this technical solution.

Example 2

The present disclosure provides a device 100 for automatically pre-detecting paper cup design defects, which enables identification of design defects solely through graphic design drafts, such that defects in a design drawing can be detected before a paper cup is printed. It should be noted that the implementation principles and specific embodiments of the device 100 for automatically pre-detecting paper cup design defects are consistent with the above method for automatically pre-detecting paper cup design defects, and therefore will not be repeated below.

Figure 9:
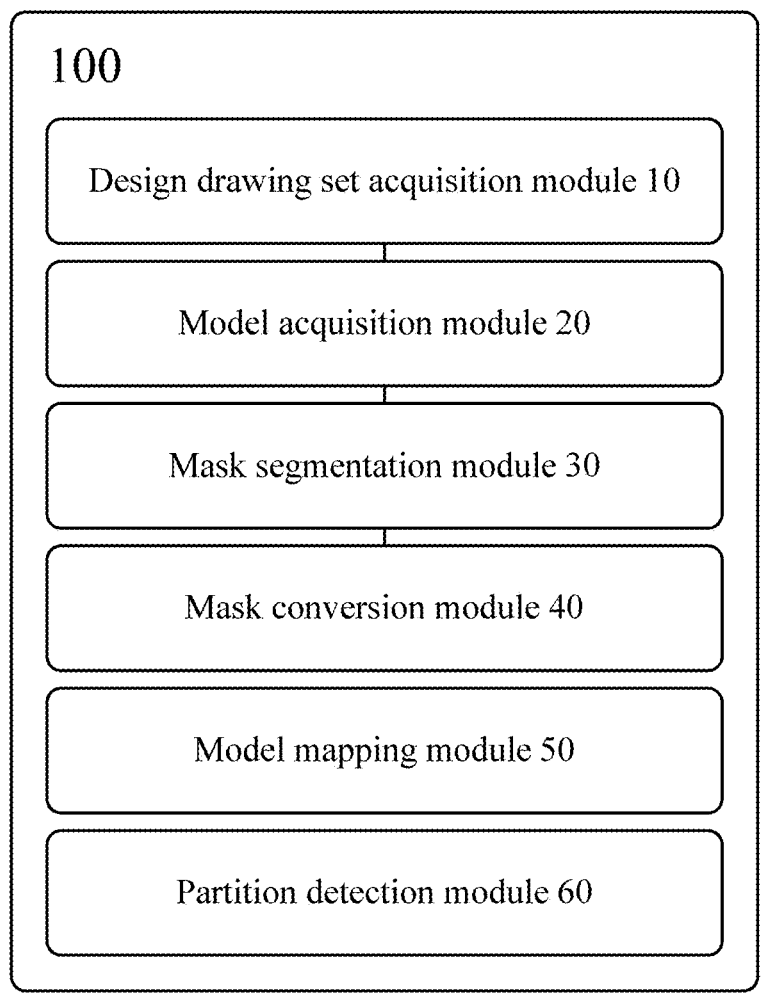
FIG. 9 is a framework diagram of a device for automatically pre-detecting paper cup design defects provided by the present disclosure.

As illustrated in FIG. 9, the device 100 for automatically pre-detecting paper cup design defects includes:

a design drawing set acquisition module 10, configured for obtaining a design drawing set with a preset precise mask covering an entire fan-shaped frame and also a prompt or annotation, where the design drawing set includes a defect-free design drawing, a defective design drawing, and a design drawing constructed according to specification data;

a model acquisition module 20, configured for obtaining an image segmentation model for detecting an image segmentation mask constructed based on a neural network technology, and importing the design drawing set into the image segmentation model for training;

a mask segmentation module 30, configured for receiving an imported design drawing to be detected, and obtaining a corresponding fan-shaped image mask through the trained image segmentation model;

a mask conversion module 40, configured for converting the fan-shaped image mask into a real fan-shaped frame;

a model mapping module 50, configured for calculating and obtaining a corresponding target model design drawing according to the real fan-shaped frame, and mapping to the specification data of a corresponding model; and a partition detection module 60, configured for partitioning the real fan-shaped frame according to the mapped specification data, detecting corresponding defects in each partition through a preset detection module, and outputting defect detection results.

Example 3

The present disclosure provides a terminal. The terminal includes a memory, a processor, and a computer program stored in the memory, where when the computer program is executed by the processor, various steps of the method for automatically pre-detecting paper cup design defects according to any of the above embodiments are implemented.

Example 4

The present disclosure provides a computer-readable storage medium. A computer program is stored in the computer-readable storage medium, and when the computer program is executed by the processor, various steps of the method for automatically pre-detecting paper cup design defects according to any of the above embodiments are implemented.

Example 5

The present disclosure provides a computer program product, and the product includes a computer program or instructions, where when the computer program or the instructions are executed by the processor, various steps of the method for automatically pre-detecting paper cup design defects according to any of the above embodiments are implemented.

To sum up, according to the method and device for automatically pre-detecting paper cup design defects provided by the present disclosure, an image segmentation model capable of precisely obtaining an image segmentation mask is constructed and trained, the obtained segmentation mask is analyzed and mapped to an image of a corresponding model, to obtain specification data of the corresponding model. Then an input design drawing to be detected is partitioned according to the specification data of the image. Finally, different defect detection modules can be called to perform corresponding defect detection in different areas. The present disclosure enables identification of design defects solely through graphic design drafts, thereby reducing costs, enhancing flexible production capabilities, and filling a gap in the paper cup industry. The present disclosure constitutes a foundation and premise for automatic and unmanned plate imposition. Defect detection functions are pluggable, that is, ineffective detection modules can be replaced, and new detection items can be added, without need to change basic modules.

Those skilled in the art can clearly understand that for the convenience and brevity of the description, only the division of the above functional units and modules is used for illustration. In practical applications, the above functions can be assigned to different functional units and modules according to needs, that is, the internal structure of the system is divided into different functional units or modules to complete all or part of the functions described above. All functional units and modules in each of the examples of the present disclosure may be integrated into one processing unit, or may be independently and physically present, or two or more units may be integrated into one unit. The above integrated units may be implemented in the form of hardware, or may be implemented in the form of a software functional unit. Furthermore, specific names of all functional units and modules are merely or the convenience of distinguishing each other and are not intended to limit the scope of protection of the present disclosure. For the specific working process of the units and modules in the above system, reference may be made to the corresponding process in the foregoing method embodiments, and details are not described herein again.

In the above examples, each example is described with its own emphasis. For parts that are not described in detail or recorded in a certain example, please refer to the relevant descriptions of other examples.

Those of ordinary skill in the art may appreciate that the units and method steps described in combination with the examples disclosed herein can be implemented through electronic hardware, or a combination of computer software and electronic hardware. Whether these functions are performed in electronic hardware or software depends on the specific application and design constraints of the technical solution. Those skilled in the art can use different methods to implement the described functions for each particular application, but such implementation should not be considered to be beyond the scope of the present disclosure.

In the examples provided by the present disclosure, it should be understood that the disclosed system or device/terminal and method may be implemented in other ways. For example, the examples of the system or device/terminal described above are merely illustrative. For example, division of the modules or units is merely a kind of division of logic functions, there may be other division modes in actual implementation, and for example, a plurality of units or assemblies may be combined or integrated into another system, or some features may be omitted or not executed. Furthermore, shown or discussed coupling or direct coupling or communication connection between each other may be an indirect coupling or communication connection by means of some interfaces, systems or units, and may be in an electrical, mechanical or other form.

The unit described as a separable component may be physically separated or not, and a component shown as a unit may be a physical unit or not, that is, may be located at one place or may also be distributed on a plurality of network units. Part or all of the units may be selected according to actual needs to achieve the objective of the solution of the examples of the present disclosure.

In addition, all functional units in each of the examples of the present disclosure may be integrated into one processing unit, or may be independently and physically present, or two or more units may be integrated into one unit. The above integrated units may be implemented in the form of hardware, or may be implemented in the form of a software functional unit.

The present disclosure is not limited merely to what is described in the specification and the embodiments, such that additional advantages and modifications can be readily achieved by those skilled in the art. Without departing from the spirit and scope of the general concept as defined by the claims and the equivalents, the present disclosure is not limited to the specific details, representative apparatus, and illustrative examples as shown and described herein.

What is claimed is:

1. A method for automatically pre-detecting paper cup design defects, comprising the following steps:
S10: obtaining a design drawing set with a preset precise mask covering an entire fan-shaped frame and also a prompt or annotation, wherein the design drawing set comprises a defect-free design drawing, a defective design drawing, and a design drawing constructed according to specification data;
S20: obtaining an image segmentation model for detecting an image segmentation mask constructed based on a neural network technology, and importing the design drawing set into the image segmentation model for training;
S30: receiving an imported design drawing to be detected, and obtaining a corresponding fan-shaped image mask through the trained image segmentation model;
S40: converting the fan-shaped image mask into a real fan-shaped frame;
S50: calculating and obtaining a corresponding target model design drawing according to the real fan-shaped frame, and mapping to the specification data of a corresponding model; and
S60: partitioning the real fan-shaped frame according to the mapped specification data, detecting corresponding defects in each partition through a preset detection module, and outputting defect detection results;
the S10 comprises the following sub-steps:
S11: obtaining a preset fan-shaped image design template;
S12: assisting to manually acquire fan-shaped image specification data through a preset software UI interaction module, wherein the fan-shaped image specification data comprises a left side line, a right side line, an angle between the two side lines, lengths of the two side lines, an upper arc vertex, a lower arc vertex, and a center and a radius of a concentric circle in a printing area;
S13: automatically constructing a fan-shaped image design drawing according to the image design template and the fan-shaped image specification data, wherein content in the printing area of the fan-shaped image design drawing can be left blank or randomly generated;
S14: adding interference information to the fan-shaped image design drawing; and
S15: based on the fan-shaped image specification data, generating a precise mask covering the entire fan-shaped frame through a preset automatic annotation module, and generating a prompt or annotation;
the S60 comprises the following sub-steps:
detecting whether a model matches according to an angle between straight lines on both sides of the fan-shaped frame, lengths of the two sides, and positions of an upper arc vertex and a lower arc vertex; and/or,
traversing pixels beyond a fan-shaped area of an image and checking existence of any non-zero pixels to determine whether there is any content beyond the fan-shaped area; and/or,
traversing pixels within the fan-shaped area and beyond a printing area, and checking existence of any non-zero pixels to determine whether there is any content beyond the printing area; and/or,
checking whether a white space left in an upper part of paper cup beyond the printing area complies with relevant national standards.

2. The method for automatically pre-detecting paper cup design defects according to claim 1, wherein the S10 comprises the following sub-steps:
obtaining an imported design drawing set that has been used in production and is error-free, generating a precise mask covering the entire fan-shaped frame through a preset automatic annotation module, and generating a prompt or annotation; or obtaining an imported design drawing set containing design errors, assisting to manually generate a precise mask covering the entire fan-shaped frame through a preset auxiliary annotation module, and generating a prompt or annotation.

3. The method for automatically pre-detecting paper cup design defects according to claim 1, wherein the S10 further comprises the following sub-step:

performing one or a combination of more of the following operations on design drawings in the design drawing set: image rotation, scaling, cropping, color changing, and noise addition.

4. The method for automatically pre-detecting paper cup design defects according to claim 1, wherein the S20 comprises the following sub-steps:

importing the design drawing set into the image segmentation model for a preset round of training to obtain an image segmentation model that has completed an initial round of training;

inputting a preset test set into the image segmentation model that has completed the initial round of training to verify an effect of generating a fan-shaped image mask of paper cup;

when verification results do not meet expected conditions, adjusting, adding, partially deleting, or completely deleting selected annotation data, and then continuing to input new annotation data into the image segmentation model for training; and repeating the above steps for a preset cycle until obtaining an image segmentation model with desired testing effects achieved.

5. The method for automatically pre-detecting paper cup design defects according to claim 1, wherein the S30 comprises the following sub-steps:

inputting a design drawing to be detected into the trained image segmentation model and determining whether a fan-shaped image mask is successfully obtained;

in case of failure to obtain the mask, detecting a fan-shaped image through a built-in target detection module of the image segmentation model, to obtain a detection frame of the fan-shaped image;

transmitting the detection frame to a built-in segmentation module of the image segmentation model, and attempting to obtain a fan-shaped image mask again; and when the image segmentation model still fails to obtain the fan-shaped image mask after attempting for a preset number of times, determining failure of obtaining, and outputting information of detection failure.

6. The method for automatically pre-detecting paper cup design defects according to claim 1, wherein the S30 comprises the following sub-steps:

converting a mask into a binary image to obtain a mask image in the format of an image file;

obtaining a minimum frame of the mask image; and cropping and normalizing the mask image to a size corresponding to an actual size of image.

7. The method for automatically pre-detecting paper cup design defects according to claim 1, wherein the S40 comprises the following sub-steps:

S41: setting a window of a preset size;

S42: traversing target pixels of a mask frame;

S43: for an area where the target pixels have a fixed size and a corresponding area of the design drawing to be detected, saving pixels on the design drawing; and S44: cyclically executing the steps S42-S43 until all pixels of the mask frame are traversed, to obtain a contour of the entire fan-shaped frame.

8. A device for automatically pre-detecting paper cup design defects, comprising:

a design drawing set acquisition module, being configured for obtaining a design drawing set with a preset precise mask covering an entire fan-shaped frame and also a prompt or annotation, where the design drawing set includes a defect-free design drawing, a defective design drawing, and a design drawing constructed according to specification data;

a model acquisition module, being configured for obtaining an image segmentation model for detecting an image segmentation mask constructed based on a neural network technology, and importing the design drawing set into the image segmentation model for training;

a mask segmentation module, being configured for receiving an imported design drawing to be detected, and obtaining a corresponding fan-shaped image mask through the trained image segmentation model;

a mask conversion module, being configured for converting the fan-shaped image mask into a real fan-shaped frame;

a model mapping module, being configured for calculating and obtaining a corresponding target model design drawing according to the real fan-shaped frame, and mapping to the specification data of a corresponding model; and a partition detection module, being configured for partitioning the real fan-shaped frame according to the mapped specification data, detecting corresponding defects in each partition through a preset detection module, and outputting defect detection results;

a specific implement process of the design drawing set acquisition module comprises the following steps:

S11: obtaining a preset fan-shaped image design template;

S12: assisting to manually acquire image specification data through a preset software UI interaction module, wherein the image specification data comprises a left side line, a right side line, an angle between the two side lines, lengths of the two side lines, an upper arc vertex, a lower arc vertex, and a center and a radius of a concentric circle in a printing area;

S13: automatically constructing a fan-shaped image design drawing according to the image design template and the fan-shaped image specification data, wherein content in the printing area of the fan-shaped image design drawing can be left blank or randomly generated;

S14: adding interference information to the fan-shaped image design drawing; and S15: based on the fan-shaped image specification data, generating a precise mask covering the entire fan-shaped frame through a preset automatic annotation module, and generating a prompt or annotation;

a specific implement process of the partition detection module comprises the following steps:

detecting whether a model matches according to an angle between straight lines on both sides of the fan-shaped frame, lengths of the two sides, and positions of an upper arc vertex and a lower arc vertex; and/or, traversing pixels beyond a fan-shaped area of an image and checking existence of any non-zero pixels to determine whether there is any content beyond the fan-shaped area; and/or, traversing pixels within the fan-shaped area and beyond a printing area, and checking existence of any non-zero pixels to determine whether there is any content beyond the printing area; and/or, checking whether a white space left in an upper part of paper cup beyond the printing area complies with relevant national standards.

\* \* \* \* \*

UNITED STATES PATENT AND TRADEMARK OFFICE
CERTIFICATE OF CORRECTION

PATENT NO. : 12,254,615 B1
APPLICATION NO. : 18/896978
DATED : March 18, 2025
INVENTOR(S) : Ming Huang Page 1 of 1

It is certified that error appears in the above-identified patent and that said Letters Patent is hereby corrected as shown below:

On the Title Page

Item (30), the following Foreign Application Priority Data was omitted. Please add:
January 16, 2024 (CN) 202410062554.8

Signed and Sealed this
Seventeenth Day of June, 2025

Coke Morgan Stewart
*Acting Director of the United States Patent and Trademark Office*